Nov. 26, 1957  J. C. HANNA  2,814,094
PORTABLE EXPANDING BROACH
Filed Jan. 17, 1955  2 Sheets-Sheet 1
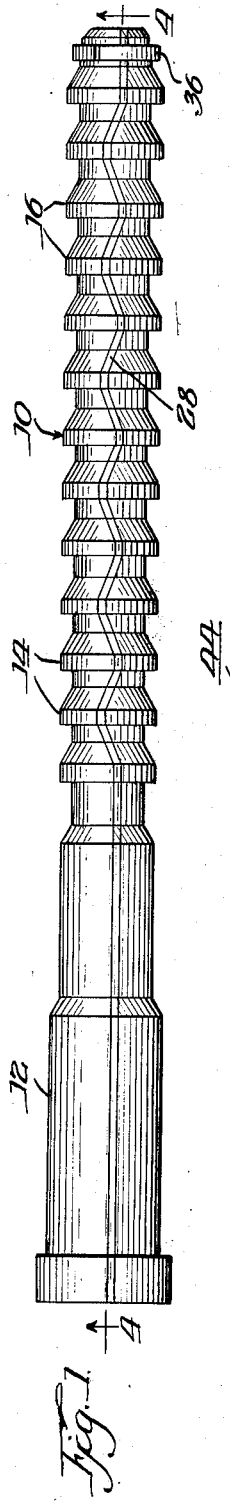
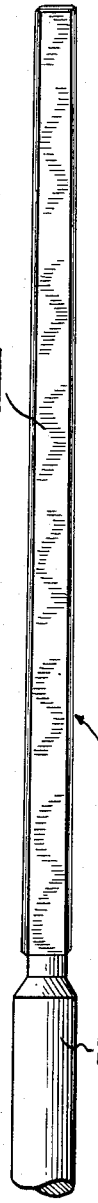
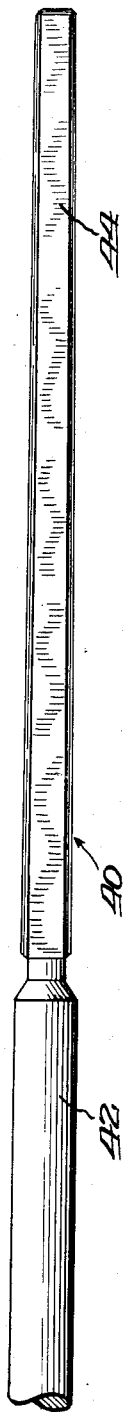
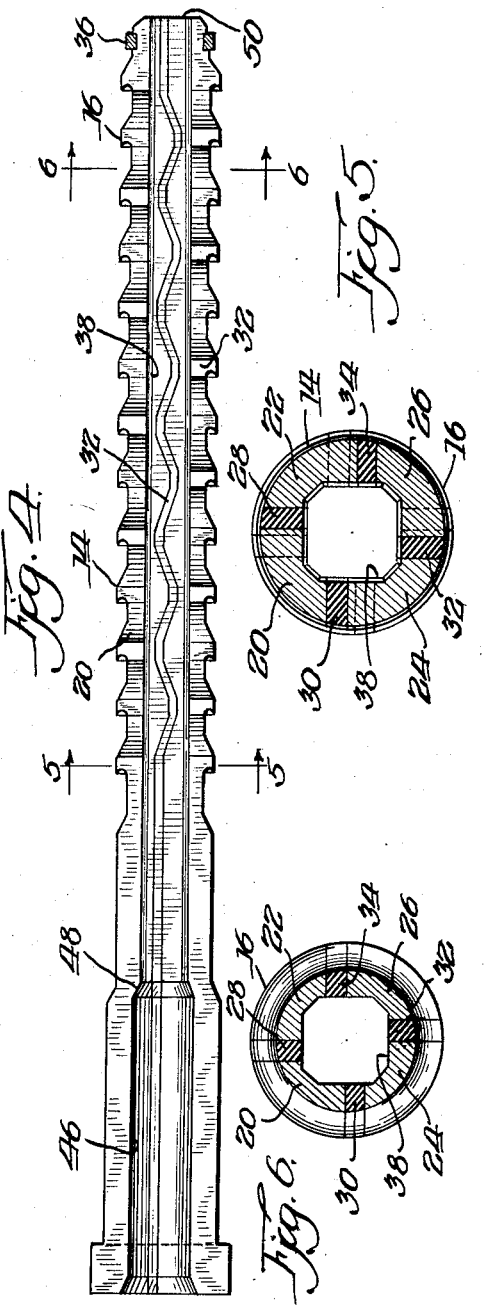
Inventor:
John C. Hanna,
By Wilkinson Huxley Byron & Hume
Attys.

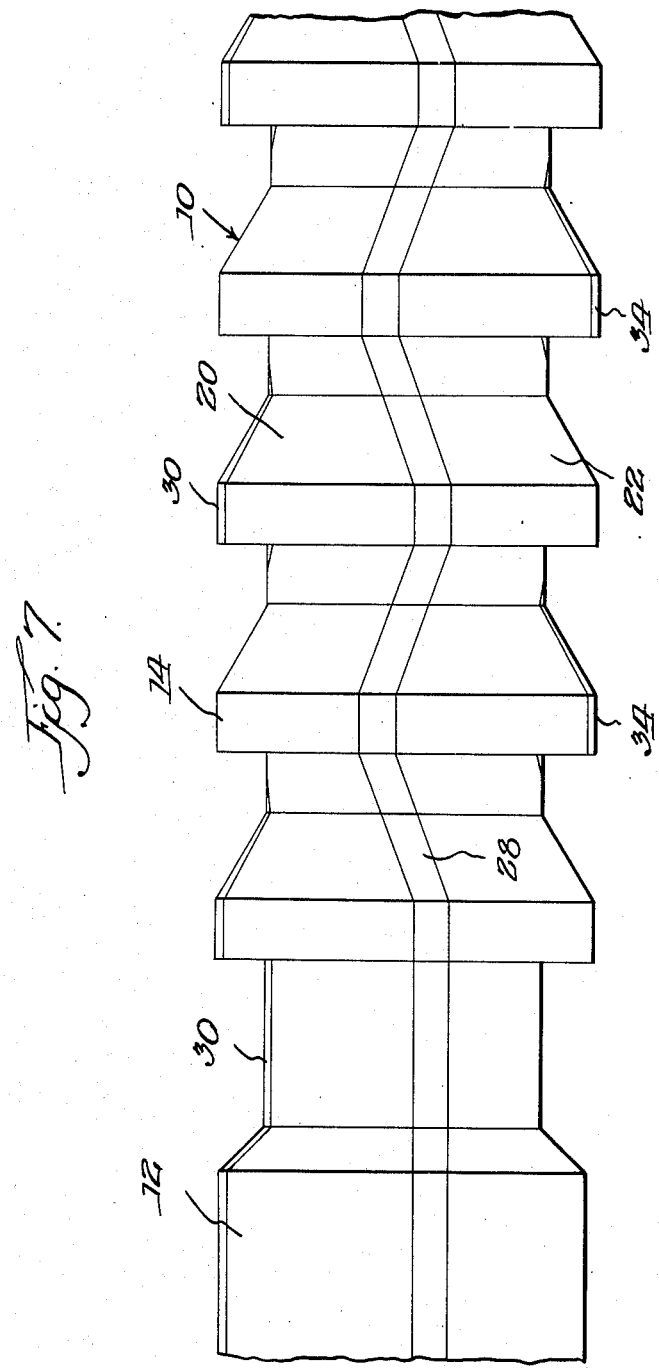

United States Patent Office 2,814,094
Patented Nov. 26, 1957

2,814,094

PORTABLE EXPANDING BROACH

John C. Hanna, Chicago, Ill., assignor to Hanna Engineering Works, Chicago, Ill., a corporation of Illinois Application January 17, 1955, Serial No. 482,069

4 Claims. (Cl. 29—95.1)

The invention relates to the art of broaching holes in metal plate and has reference more particularly to an expansible broaching tool characterized by being sectioned longitudinally to form a plurality of sections which are bonded together by resilient material so that the broaching tool can be caused to expand and contract for varying the diameter of its cutting teeth.

Accordingly, the basic object of the invention is to provide a broaching tool which is capable of being expanded circumferentially as a result of longitudinal strips of rubber which extend for the length of the tool and effectively bond the metal sections to each other to form a unitary article.

Another object of the invention resides in the provision of an expansible broaching tool for broaching holes in metal plate and the like and wherein said tool by reason of its expansibility can be inserted through and withdrawn from a hole in the metal plate with both operations taking place from the same side thereof.

Another object is to provide an expansible broaching tool wherein the same is sectioned longitudinally with the sections being bonded to each other by resilient material so that the insertion of a tapered lance within the broaching tool will have the effect of increasing the broach diameter in an amount equal to the increase of taper per inch as regards the lance.

Another and more specific object is to provide an expansible broaching tool having longitudinally extending rubber strips bonded to segmental sections of the tool with each rubber strip having an undulating or wavy contour as viewed in plan, whereby any pair of adjacent teeth on the tool will broach for the full circumference thereof.

A further object is to provide an expansible broaching tool which will be relatively economical to manufacture, which will be rugged and durable and capable of a relatively long life, notwithstanding the rough treatment to which tools of this nature are subjected, and which will be highly efficient in operation.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is an elevational view showing an expansible broaching tool constructed in accordance with and embodying the improved features of the present invention;

Figure 2 is an elevational view illustrating the retracted position of a tapered lance which when inserted within the broach to the extent as shown allows contraction of the resiliently bonded sections of the tool;

Figure 3 is an elevational view of the tapered lance showing the forward inserted position of the same for expanding the broaching tool;

Figure 4 is a longitudinal sectional view taken substantially along line 4—4 of Figure 1;

Figure 5 is an enlarged transverse sectional view taken along line 5—5 of Figure 4, the same illustrating certain constructional details of the present expansible broach and showing the same in contracted condition;

Figure 6 is an enlarged transverse sectional view taken along line 6—6 of Figure 4 and also showing the broach in contracted condition; and Figure 7 is a fragmentary elevational view on an enlarged scale of the expansible broaching tool shown in Figure 1.

Referring to the drawings, Figure 1, the broach 10 of any suitable metal essentially consists of a shank portion 12 and a broaching portion comprising a plurality of roughing, finishing and burnishing teeth such as 14 and 16, the teeth 14 having the smallest diameter and the teeth 16 having the largest diameter. The teeth progressively increase in diameter from 14 to 16, whereby as the broaching tool is withdrawn from the hole being broached the same is interiorly finished to the desired completed size. The shank end of the broach is adapted to be gripped by a flange retaining collar forming part of a broach pulling machine and following insertion of the broaching tool in contracted condition through the hole in the metal plate, the said tool is expanded and then withdrawn by operation of the machine whereby to complete a broaching operation. For a detailed explanation of the construction and mode of operation of such a broach pulling machine reference is made to the copending application of Willard J. Schupner, Serial No. 471,430, filed November 26, 1954, and entitled Broach Pulling Machine.

In order to provide for expansion and contraction of the present broaching tool the same is formed by associating four segmental sections identified by numerals 20, 22, 24 and 26. The size of each segmental section is slightly less than a quarter section of the tool since as a result space is provided for the resilient bonding strips which hold the segmental sections together. Each resilient bonding strip functions to join adjacent sections to each other to form a unitary article. For example, the resilient bonding strip 28, which may consist of synthetic rubber or the like, is located between, and the said strip bonds together the sections 20 and 22. In a similar manner the resilient bonding strip 30 joins together the sections 20 and 24. Sections 24 and 26 are joined by the bonding strip 32 and sections 22 and 26 are joined by the bonding strip 34. Each strip is sufficiently resilient to allow the segmental sections of the metal tool to move radially with respect to the axial center of the tool to vary the size of the tool circumferentially by increasing the diameter of the teeth 14 and 16. The resilient bonding strips adequately hold together the four segmental sections of the tool. Notwithstanding, it is desired to employ a split ring or collar 36 for retaining the segmental sections at the right hand end of the tool. It will be recalled that the left hand end, that is, the shank end 12, is similarly retained since this end is gripped by the flanged retaining collar of the broach pulling machine.

It is necessary for the rubber connecting strips to have a wavy or undulating formation since otherwise the broach would not perform a broaching operation for the full extent of its circumference. Accordingly, the gaps between the segmental sections have a zigzag or wavy formation and the rubber strips, having location within the gaps, are similarly contoured. This structural feature is necessary since, whereas one tooth will not broach at the gaps in its circumference, the next adjacent tooth will broach because the gaps are angularly displaced with respect to each other and this continues for the length of the broach. Thus the rubber connecting strips provide for expansion of the broaching tool, which is effected after the same has been inserted in the hole. The wavy or zigzag formation of the gaps between sections is necessary to assure full broaching action for the complete circumference of the hole.

The segmental sections 20, 22, 24 and 26 are somewhat smaller in angular extent than a full quarter section of the tool, this structural feature being necessary in order to provide space between adjacent sections for accommodating the resilient bonding material. Accordingly, each segmental section together with a rubber bonding strip will angularly subtend approximately 90 degrees. Each of the segmental sections is provided with a flat bottomed groove on its interior surface and which, in combination, provide a passage 38 located centrally and extending through the broaching tool when the segmental sections are associated as shown in Figure 5. The flat bottomed groove in each section aligns with the similar groove in an adjacent section, so that the passage through the broaching tool is approximately square. This constructional feature is desirable since the broaching tool has telescoping relation with a tapered lance, the said lance being insertable in the passage of the tool for expanding the tool, and rotation of the tool with respect to the lance must be prevented. Thus the passage extending through the tool must be noncircular or the like. Of course, whatever the cross-sectional shape of the passage may be, it will be understood that the tapered lance may have a similar cross-sectional shape.

More particularly, the lance identified by numeral 40, as shown in Figures 3 and 4, consists of a shank portion 42 and a tapered portion 44. When the tapered lance is reciprocated into a retracted position, as indicated in Figure 2, the broaching tool is permitted to contract so that the diameter of the cutting teeth will be a minimum. When the tapered lance is projected forwardly within the passage 38 to the position as shown in Figure 3, the broaching tool is expanded and the increase in diameter of the cutting teeth will be equal to the increase of taper per inch as regards the lance. For accommodating the tapered lance it will be understood that the passage 38 has an interior taper extending from approximately its left hand end to its right hand end. However, to accommodate the shank end of the lance the passage 38 at the left hand end of the broaching tool is somewhat enlarged in diameter, forming an enlarged entrance passage 46, which passage is cylindrical throughout so that the tapering passage 38 has its maximum diameter at 48 and tapers interiorly to a minimum diameter at the right hand end 50 of the broaching tool.

In operation of the broaching tool of the invention the shank portion 12 thereof is gripped by a broaching machine such as herein referred to and which also provides means for reciprocating the tapered lance 40. It will be understood that the lance 40 has inserted relation within passage 38 of the tool, and with the lance in retracted position the tool is contracted so that the same can be inserted through an opening to be broached. The tapered lance is then reciprocated in a forward direction for expanding the tool, the result of which is to increase the diameter of the cutting teeth of the tool an amount equal to the increase in the taper per inch as regards the lance. The tool in expanded condition can now be withdrawn from the hole and this action completes the broaching operation on the hole. The expansion of the tool is made possible by the resilient bonding of the segmental sections, which are circumferentially arranged so that the resilient bonding strips are angularly spaced approximately ninety degrees from each other. This circumferential arrangement of the segmental sections also provides a passage through the broaching tool which is non-circular in cross section. More particularly, the passage as shown in Figure 5 is approximately square so that the tool when in telescoping relation on the tapered lance will be prevented from rotation relative to the lance. Such rotation is not desirable for the reason that the rubber bonding strips have a zigzag formation, and rotation of the tool on the lance might have the effect of destroying the utility of said zigzag formation of the strips. The bonded synthetic rubber between the broach segments not only serves to permit expansion and contraction of the parts but also functions as a seal in preventing chips, such as might interfere with proper contraction, from becoming lodged between the segments.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. A broaching tool comprising, in combination, a cylindrical member of elongated formation having a central passage extending through the same from end to end, said member having a shank portion at one end and having cutting teeth exteriorly thereof for the remainder of the length of the member, said member being formed of segmental sections circumferentially associated so as to leave gaps between the side edges of the sections and which extend for the length of the member, resilient material having location in the gaps and being bonded to adjacent sections so that the sections are united to form a unitary article, each segmental section together with a resilient bonding strip sub-tending approximately ninety degrees, and each segmental section also having a flat bottomed groove on its inside surface, whereby the passage extending centrally through the member is substantially square in cross section.

2. A broaching tool comprising, in combination, a cylindrical member of elongated formation having a passage extending through the same from end to end, said member having a shank portion at one end and having cutting teeth exteriorly thereof for the remainder of the length of the member, said member being formed of segmental sections circumferentially associated so as to leave longitudinal gaps between the side edges of the sections, resilient material having location in the gaps and being bonded to adjacent sections so that the sections are united to form a unitary article, the said resilient bonding strips having a zig-zag longitudinal contour for that portion of the member provided with cutting teeth whereby to assure complete circumferential broaching, the passage extending through the member being substantially square in cross section, and said passage having an interior taper from a maximum size at the shank end to a minimum size at the opposite end.

3. A broaching tool comprising, in combination, a cylindrical member of elongated formation having a central passage extending through the same, said member having a shank portion at one end and having cutting teeth exteriorly thereof for the remainder of the length of the member, said member being formed of segmental sections circumferentially associated so as to leave gaps between the side edges of the sections and which extend for the length of the member, resilient material in the form of rubber strips having location in the gaps and being bonded to adjacent sections so that the sections are united to form a unitary article, the passage extending through the member being substantially square in cross section and said passage tapering interiorly from the shank end to the opposite end, and a lance for insertion in the passage, said lance also being square in cross section and having a longitudinal taper complementary to that of the passage, whereby the tapered lance is non-rotatably associated with the member by inserting the lance in the passage for the purpose of expanding the member.

4. A broaching tool comprising in combination, a cylindrical member of elongated formation having a passage extending through the same, said member having a shank portion at one end and having cutting teeth exteriorly thereof for the remainder of the length of the member, said member being formed of segmental sections circumferentially associated so as to leave longitudinal gaps between the side edges of the sections, resilient material having location in the gaps and being bonded to adjacent sections so that the sections are united to form a unitary article, the said gaps having a zig-zag longitudinal contour for that portion of the member having the cutting teeth to assure complete circumferential broaching, the passage extending through the member being substantially square in cross-section, and said passage tapering interiorly from the maximum opening at the shank end to the minimum opening at the opposite end, and a lance for insertion in the passage, said lance also being square in cross-section and having a longitudinal taper complementary to that of the passage, whereby the tapered lance is non-rotatably associated with the member by inserting the lance in the passage for the purpose of expanding the member.

References Cited in the file of this patent

UNITED STATES PATENTS

| | | |
|---|---|---|
| 420,616 | Brightman | Feb. 4, 1890 |
| 1,477,651 | Koeln | Dec. 18, 1923 |
| 1,485,652 | Wakefield et al. | Mar. 4, 1924 |